United States Patent
Lee

(10) Patent No.: US 6,807,811 B2
(45) Date of Patent: Oct. 26, 2004

(54) AIR CONDITIONER WITH HEAT PIPE

(76) Inventor: Jae Hyuk Lee, Sung-gok B/D, 8F, 823-22 Yeoksam-Dong, Kangnam-Gu, Seoul (KR)

(*) Notice: Subject to any disclaimer, the term of this patent is extended or adjusted under 35 U.S.C. 154(b) by 0 days.

(21) Appl. No.: 10/200,601

(22) Filed: Jul. 22, 2002

(65) Prior Publication Data

US 2003/0029175 A1 Feb. 13, 2003

(30) Foreign Application Priority Data

Jul. 20, 2001 (KR) ......................................... 2001-21998
Jul. 20, 2001 (KR) ......................................... 2001-22000

(51) Int. Cl.⁷ .............................................. F25B 21/02
(52) U.S. Cl. .......................................................... 62/3.7
(58) Field of Search ..................................... 62/3.2, 3.7

(56) References Cited

U.S. PATENT DOCUMENTS

| | | | |
|---|---|---|---|
| 4,019,098 A | | 4/1977 | McCready et al. |
| 4,470,450 A | | 9/1984 | Bizzell et al. |
| 4,619,317 A | | 10/1986 | Disselbeck et al. |
| 5,653,111 A | | 8/1997 | Attey et al. |
| 5,715,684 A | * | 2/1998 | Watanabe et al. ............. 62/3.2 |
| 5,752,566 A | | 5/1998 | Liu et al. |
| 5,860,472 A | * | 1/1999 | Batchelder .................. 165/185 |
| 6,058,712 A | * | 5/2000 | Rajasubramanian et al. .. 62/3.6 |
| 6,155,075 A | | 12/2000 | Hanson et al. |
| 6,283,068 B1 | | 9/2001 | Kamikozuru |
| 6,318,118 B2 | | 11/2001 | Hanson et al. |
| 6,354,086 B1 | * | 3/2002 | Inoue et al. ................... 62/3.2 |
| 6,598,405 B2 | | 7/2003 | Bell |

2002/0020521 A1   2/2002   Hoshina et al.

FOREIGN PATENT DOCUMENTS

| | | |
|---|---|---|
| DE | 33 20 632 A1 | 12/1984 |
| EP | 0 128 490 A2 | 12/1984 |
| EP | 0 128 490 A3 | 12/1984 |
| EP | 1 854 327 A1 | 7/1998 |
| EP | 1 092 911 A2 | 4/2001 |
| EP | 1 092 911 A3 | 4/2001 |
| EP | 1 167 911 A2 | 1/2002 |
| EP | 1 167 911 A3 | 1/2002 |
| JP | 60-11089 | 1/1985 |
| JP | 10-205918 | 8/1998 |
| JP | 2001-182895 | 7/2001 |
| JP | 2002-81795 | 3/2002 |

* cited by examiner

Primary Examiner—Henry Bennett
Assistant Examiner—Malik N. Drake
(74) Attorney, Agent, or Firm—Smith, Gambrell & Russell, LLP

(57) ABSTRACT

An air conditioner contains one or more vertically positioned manifolds. Each manifold defines a vapor space, a liquid space, and capillary tubes connecting the two spaces. The manifold is filled with a refrigerant or heating fluid. The manifold is either cooled or heated by thermoelectric modules. The fluid cycles through evaporation and condensation within the manifold, without the aid of a condenser or pump. Alternating banks of heating and cooling manifolds may be combined so that thermoelectric modules positioned between the manifolds will heat the heating manifolds and cool the cooling manifolds. A combined air conditioner and heater may be used in automobiles and buildings. The heating manifolds my be used to heat air, water or other fluid streams.

20 Claims, 17 Drawing Sheets

700

AIR CONDITIONER WITH HEAT PIPE

FIELD OF THE INVENTION

The present invention relates to an improved air conditioner and heater with an improved heat pipe array thermally connected to a pre-selected number of thermoelectric modules. The air conditioner may include a heater component.

BACKGROUND OF THE INVENTION

Conventional cooling systems using thermoelectric modules suffer from various limitations and relatively low heat transfer efficiency. By way of example, Korean patent 2000-54406 is an example of an earlier cooling system using a thermoelectric module and conventional heat transfer arrangement. An example of another earlier heat transfer system employing a heat transfer pipe without thermoelectric module components, is described in Korean patent number 190443. Other examples of earlier systems include: U.S. Pat. No. 6,354,086 to Inoue et al., U.S. Pat. No. 5,232,516 to Hed, U.S. Pat. No. 5,269,146 to Kerner, U.S. Pat. No. 5,540,567 to Schirpke et al., U.S. Pat. No. 5,653,111 to Attey et al., and U.S. Pat. No. 5,675,973 to Dong. The foregoing examples describe conventional fluid pumping and piping systems for transportation of fluid within the heat transfer or cooling systems described in those patents.

Some of the earlier systems have attempted to improve the efficiency of heat exchange by incorporating complex fluid agitators. U.S. Pat. No. 6,354,086 to Inoue et al. is an example of an earlier patent in which such agitators are described. U.S. Pat. No. 5,269,146 describes a closed system heating and cooling system for thermally insulated containers such as portable refrigerated chests, heated bottles and serving carts for hotels and restaurants. Thermally conductive fluid is circulated through a closed loop circulating system. The heated or cooled fluid is passed through an air core heat exchanger for heat exchange with surrounding ambient air. The patent describes that the fluid is pumped at high speeds through the closed system to promote efficient heat transfer.

These earlier systems have not addressed the advantages of providing heat exchange systems having the improved efficiencies associated with harnessing the natural forces and inherent fluid flow characteristics of the capillary flow systems described below.

SUMMARY OF THE INVENTION

Many of the earlier, conventional heat transfer systems do not provide for an efficient structure or method for distributing the cooling effect of thermoelectric modules provided in cooling systems such as cooling-type air conditioners. The overall efficiency of the cooling device depends to a substantial part upon the ability of the device to effectively utilize the cooling power of the array of thermoelectric modules. In effect, it is desirable to provide a system in which there is an efficient heat transfer interface between the cooling faces of the thermoelectric modules and the circulatory system to distribute the "cold supply" furnished by the cooling faces of the thermoelectric modules.

In one aspect of the invention, a cooling manifold is used in which the manifold comprises an upper cylinder, a lower cylinder and a plurality of vertically arranged heat pipes providing fluid communication between the upper and lower cylinders. Each of the heat pipes is a generally, planar, elongated member extending between the upper and lower cylinders. The manifold defines an interior volume for closed circulation of a thermally conductive fluid. In a preferred embodiment, the upper and lower cylinders and interconnecting heat pipes define a generally vertical plane when the manifold is installed for operation.

A pre-selected number of thermoelectric modules are arranged for thermal communication with the upper cylinder. The upper cylinder defines a surface to thermally communicate with an aligned array of thermoelectric modules presented so that their cooling faces are in thermal communication with the upper cylinder of a cooling manifold. The interior volume of the manifold will be charged with a suitable thermally conductive fluid that will circulate within the internal volume during operation of the air conditioning device. The heat pipes define a plurality of vertically arranged, elongated capillaries that allow fluid communication of the thermally conductive fluid between the upper and lower cylinders of the self contained manifold. The thermally conductive fluid contained within the manifold will tend to flow within the internal channels of the heat pipes due in part to the cooling effect upon the fluid caused by the heat transfer process affected between the cooling faces of the thermoelectric modules and the upper cylinder of the manifold. In addition, the thermally conductive fluid will tend to flow in part due to the capillary action exerted on the fluid charged within the interior volume of the manifold, and extending within the capillaries of the heat pipes. One of the advantages of the invention is that it is unnecessary to provide a circulating pump to circulate a thermally conductive fluid within the interior chamber of the heat pipes. Although there may be instances where a circulating pump may be added for that purpose, such a pump would not be necessary to circulate the thermally conductive fluid filled within the interior volume of the upper cylinder, heat pipes and lower cylinder.

During assembly, an access port (not shown) may be provided on the manifold to evacuate entrapped air from within the internal chambers of the lower cylinder, upper cylinder and capillaries within the heat pipes. In a preferred embodiment, the interior chamber of the heat pipes is drained of entrapped air so a substantial vacuum is created. Thereafter, the interior chamber of the lower cylinder, upper cylinder and capillaries of the heat pipes are filled with an effective amount of the thermally conductive fluid until a substantial portion of the interior volume of that structure is filled with a liquid phase of the thermally conductive fluid. The remaining portion of the interior volume is filled with the vapor phase of the selected thermally conductive fluid. After the manifold is charged with the appropriate fluid, the access port may be closed by applying a suitable stopper or cap.

As noted above, a thermally conductive fluid is provided within the enclosed fluid reservoir of the manifold. Heat exchange occurs through the operation of the thermoelectric modules and the repeated evaporation and condensation of the thermally conductive fluid within the fluid reservoir of the manifold.

In a preferred embodiment, the fluid within the interior volume is filled until the liquid phase occupies about 40% to 70% of that interior volume. The vapor phase will occupy between about 30% and 60% of that interior volume, in a preferred embodiment. These amounts are preferred charging ratios. However, other operatively effective amounts may be chosen to meet selected design criteria.

In a further preferred embodiment of the invention, the capillary channels in a heat pipe are generally rectangular tubes defined by the interior walls of each heat pipe. Preferably, the interior walls extend orthogonally from one face of the heat pipe to the opposing face of the heat pipe. However, the capillaries may be manufactured to have other cross-sectional configurations that are not necessarily square or rectangular in shape. The relative size of the capillaries may vary according to the design requirements and characteristics of the desired heat exchange system. In a preferred system directed to the use of water based thermally conductive fluid systems, the diameter of the capillaries will typically range below about 4 mm. In some instances, it may be desirable to provide additives or other fluids to enhance the physical properties of the fluid circulating within the capillaries. Consequently, the diameter of the capillaries may be adjusted to accommodate the particular characteristics of a specific fluid selected for use in the system.

In another preferred embodiment, the capillaries are arranged in a single layer of capillaries within the outer walls of a given heat pipe. In other instances, multiple layers of capillaries may be provided within the outer walls of each heat pipe, although in many cases, such an arrangement may not be preferred.

The heat pipes, upper cylinder, and lower cylinder are preferably made of relatively strong, resilient, and thermally conductive material and most preferably, a metal which is not susceptible to excessive corrosion. Aluminum is a particularly useful material of construction for many applications of the present invention. Of course, persons skilled in the art will understand that other materials, including other metals, alloys, or non metallic materials may be desirable for use in the particular conditions and circumstances under consideration. Similarly, other components of an air conditioner and air conditioning assembly are preferably made of compatible materials that will exhibit similar advantages and benefits.

A variety of thermally conductive fluids may be used according to the design requirements of a particular system. For example, in heating applications, many conventional fluids including water, acetone, ethanol and methanol may be desirable as relatively low-cost thermally conductive fluid choices for use within the manifold. It will be appreciated that the foregoing examples of potentially useful fluids are merely illustrative and are not intended to represent an exhaustive list of all suitable thermally conductive fluids.

In some heat exchange systems, capillaries having cross-sectional diameters of about 4 mm in diameter will be particularly efficient in heat transfer applications. In another instances, it may be desirable to use capillaries with smaller effective diameters. Capillaries that are generally rectangular when viewed in cross-section may have dimensions of 1 mm×1.4 mm or lower. In other instances, the capillaries may have cross-sectional dimensions of about 0.5 mm×0.6 mm. Of course, other sizes of capillaries may be selected based on various design considerations.

In other embodiments, a plurality of vertically oriented manifolds may be combined to form a heat exchange arrangement featuring a heating component and a cooling component. The heating component is featured by one or more upper heating manifolds secured on opposite sides of one or more lower cooling manifolds. The overall heat exchange arrangement, may be formed by alternating heating and cooling manifolds in alternating arrangements where the cooling manifolds are positioned between opposing pairs of heating manifolds. In this example, a plurality of thermoelectric modules are sandwiched between an upwardly disposed heating manifold and an adjacent, downwardly disposed cooling manifold. The thermoelectric modules are arranged so that all of the cooling faces of such modules are in thermal communication with the upper cylinder of the cooling manifold. All of the heating faces of the intermediately disposed thermoelectric modules are positioned to be in thermal communication with the lower cylinder of the adjacent, upwardly disposed heating manifold. A combined heating and cooling device for automotive and other applications may be provided with an air control feature to selectively direct air across the heating or cooling manifolds to condition that air prior to entry into an automobile or other structure.

In other embodiments of the invention, a fan or other blower element may be provided for directing air flow across the heat pipes of one or more manifolds provided in a heating or cooling device of the present invention.

In some embodiments of the invention, it may be desirable to incorporate a warm water supply for generating heated water (rather than warmed air) by directing a flow of water in thermal communication with the heating faces of a selected number of thermoelectric modules. The cooling faces of the modules will be aligned in a cooling array, in thermal communication with a cooling manifold in an air conditioning device.

In another preferred embodiment of the present invention, the air conditioner comprises a heat exchange manifold in which the generally planar, elongated heat pipes are arranged in a planar array along the longitudinal axes of the upper and lower cylinders. The upper and lower cylinders are positioned in parallel, with the elongated heat pipes extending between the two cylinders. The heat pipes are positioned in parallel to each other so that a gap is formed between opposing faces of the heat pipes. The gaps between the heat pipes provide channels for air flow, for thermal communication across the faces of the heat pipes during a cooling cycle. In some embodiments, the surfaces of the heat pipes may be textured or modified to increase their effective surface area for heat transfer between the transported air (or other fluid) and the heat pipes. For example, interconnecting ribs, fins or other projections may be provided between adjacent heat pipes in order to improve the heat transfer between flowing air and the heat pipes.

Thermoelectric modules are also known in the art as Peltier devices. Earlier examples of Peltier devices are generally wafer-like structures that produce heat and cooling effects upon application of electric current. In most embodiments of the invention, DC power sources will be utilized to produce uniform heating or cooling effects upon a target body or system component.

Other embodiments, and aspects of the invention will become apparent upon a review of the details and explanations of the invention and upon a review of the attached drawings which follow within this application.

IN THE DRAWINGS

DETAILED DESCRIPTION OF EMBODIMENTS OF THE INVENTION

Figure 1:
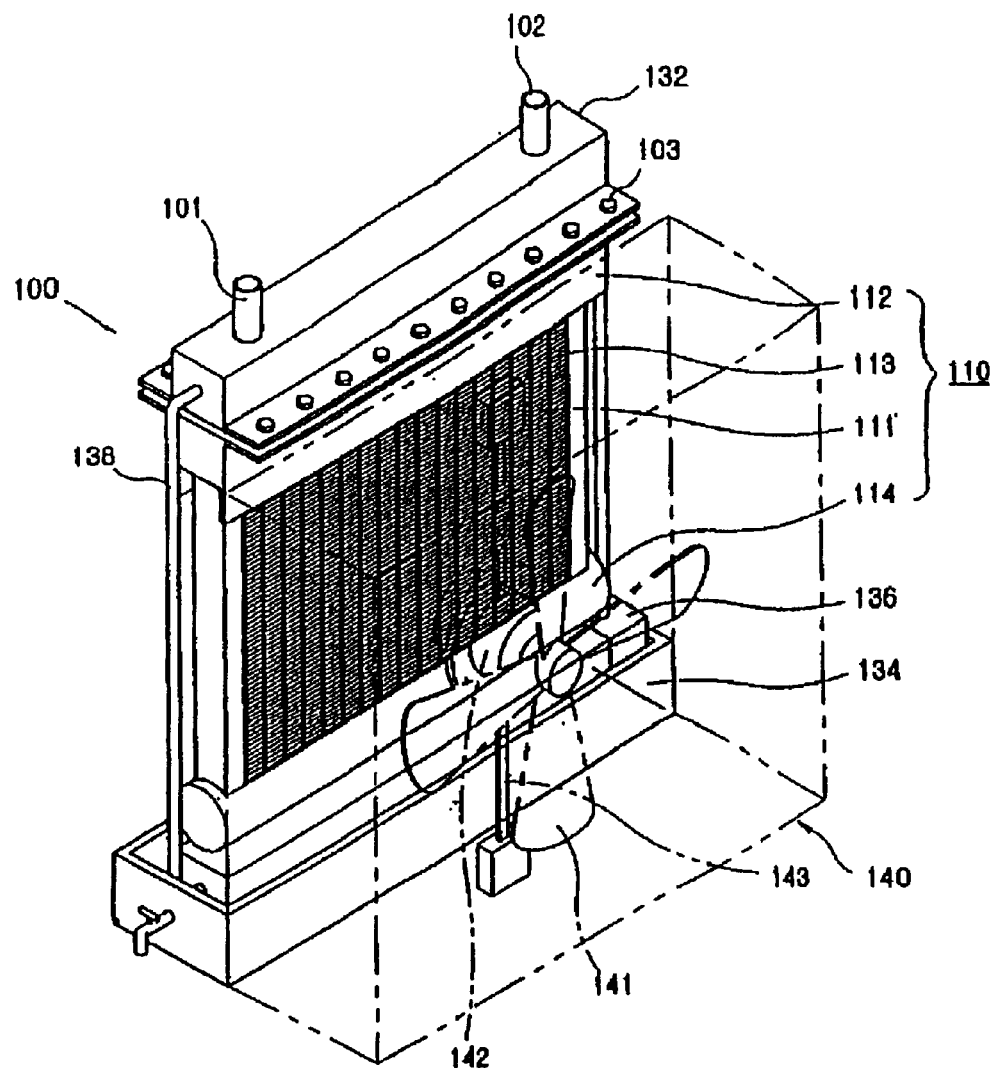
FIG. 1 is a perspective view of one embodiment of an air conditioning device of the present invention.
Figure 2:
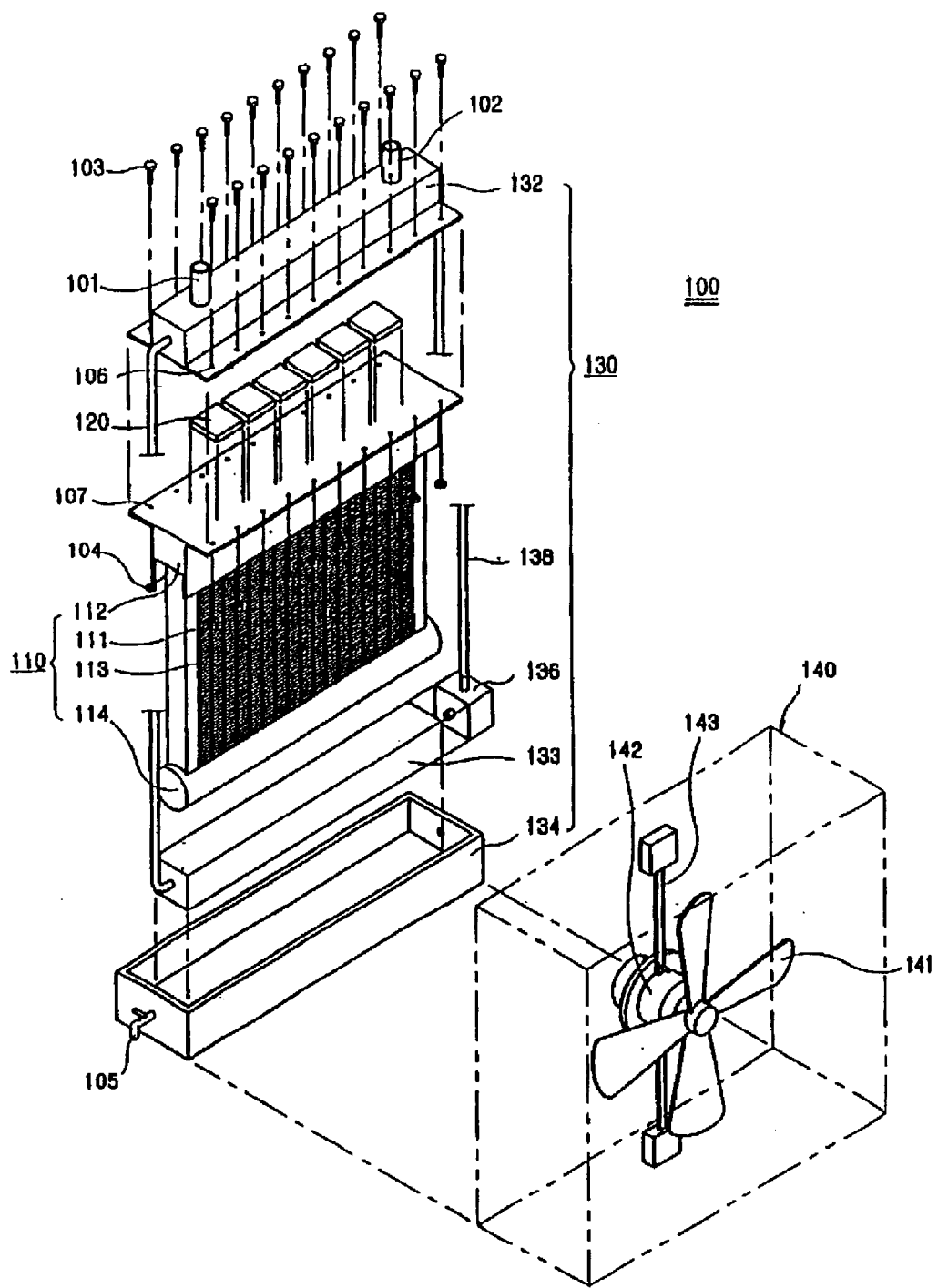
FIG. 2 is an exploded view, in perspective, of the embodiment of an air conditioning device shown in FIG. 1.
Figure 3:
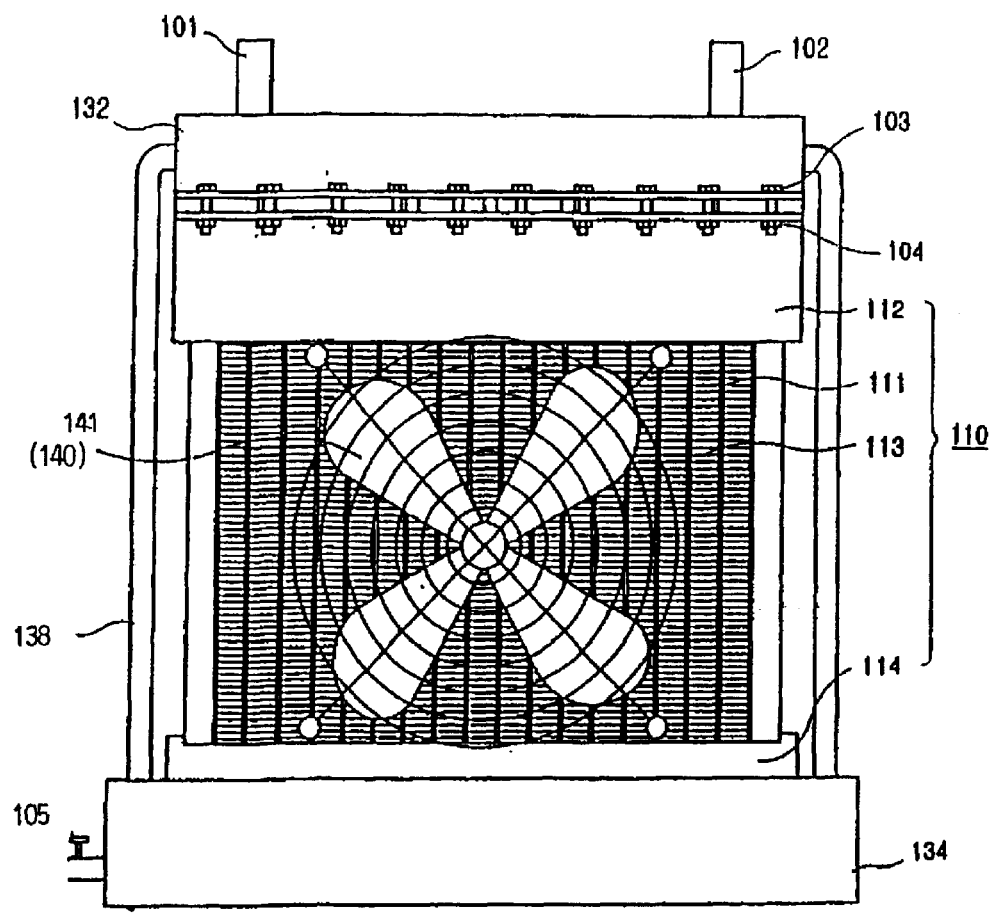
FIG. 3 is a frontal view of the air conditioning apparatus shown in FIG. 1.

One embodiment of the invention incorporating an air conditioning structure is described with reference to FIGS. 1, 2, 3, 4, and 5. In FIG. 1, a perspective view is illustrated of an air conditioning assembly which incorporates a cooling manifold of the present invention. Air conditioner 100 includes an inlet 101 for cooling water and an outlet 102 for out flow of water from an upper cooling water chamber 132. Cooling manifold 110 is in thermal communication with the upper cooling water chamber 132. The cooling manifold is also in thermal communication with a lower water chamber 136 and a water condensation tank 134. A fan or other blowing device 140 is featured to draw air across the cooling manifold. An array of thermoelectric modules is located between the upper cooling water chamber 132 and the upper cylinder 112 of the manifold.

The operation of the air conditioning device may be illustrated with reference to its major components, including, thermoelectric modules 120, cooling manifold 110, water cooling system 130, and a fan assembly 140.

Manifold 110 is in thermal communication with the thermoelectric modules 120. The manifold defines an interior volume for containing a thermally conductive fluid or medium 115. A plurality of heat pipes 111 extend vertically between the first cylinder 112 and lower cylinder 114. The heat pipes 111 define a plurality of capillary tubes extending between the inner spaces formed by the upper cylinder 112 and the lower cylinder 114. When assembled, the interior volume of the manifold is defined by the interior spaces of those three components. The capillary channels defined by the heat pipes 111 permit fluid communication between the upper cylinder 112 and the lower cylinder 114. The manifold is also provided with a plurality of conductive fins 113 to increase the effective surface area, and occupy the space between adjacent, vertically aligned heat pipes 111.

The heat pipes are arranged in a linear array, so that the planar faces of adjacent heat pipes are parallel, to define a gap so that air may pass between the adjacent, parallel heat pipes. Air flowing through the gap will contact the exposed surface area of the parallel heat pipes and the added surface area provided by the thermally conductive fins 113.

The thermally conductive fluid will be charged into the interior volume of the manifold so that a portion of the interior volume is occupied by vapor (in the space generally indicated by 115) and a second portion of the thermally conductive fluid will generally occupy the lower portion of the manifold (generally represented by space 116).

Upper cooling water chamber 132 and upper cylinder 112 of the manifold are bolted together. The parts are assembled with bolts 103 and nuts 104 using suitably preformed coaxial holes for securing those parts together. Upper and lower connecting plates 106, 107 may also include a preformed gasket material to protect the thermoelectric modules 120 positioned between upper and lower connecting plates 106, 107. A preformed gasket material may be useful to protect the modules against accidental damage due to over-tightening of the bolt and nut assemblies. Similarly, the gasket materials may provide beneficial insulative qualities to inhibit heat transfer between the upper and lower connecting plates 106, 107.

In this embodiment, an upper cooling assembly is provided. The cooling assembly 130 consists of upper cooling water chamber 132, lower cooling water chamber 133, water condensation tank 134, a circulation pump 136, and a circulation pipe 138. Drain spout 105 is provided on water condensation tank 134 to drain excess water that may accumulate in the tank. Water is circulated within the upper cooling assembly to absorb heat generated by the upwardly aligned heating faces of the thermoelectric modules 120. The cooling assembly is used to inhibit the heating of air flowing through the air conditioning device. The components of the cooling assembly 130 are in fluid communication so that water is circulated through the system by circulation pump 136.

A fan or other suitable blowing device is shown positioned adjacent a face of the cooling manifold. The fan 141 is driven by motor 142, supported on a mounting bracket or other supporting element 143. The fan is positioned to blow air through the gaps formed between a bank of heat pipes provided within the manifold of the air conditioner.

Figure 4:
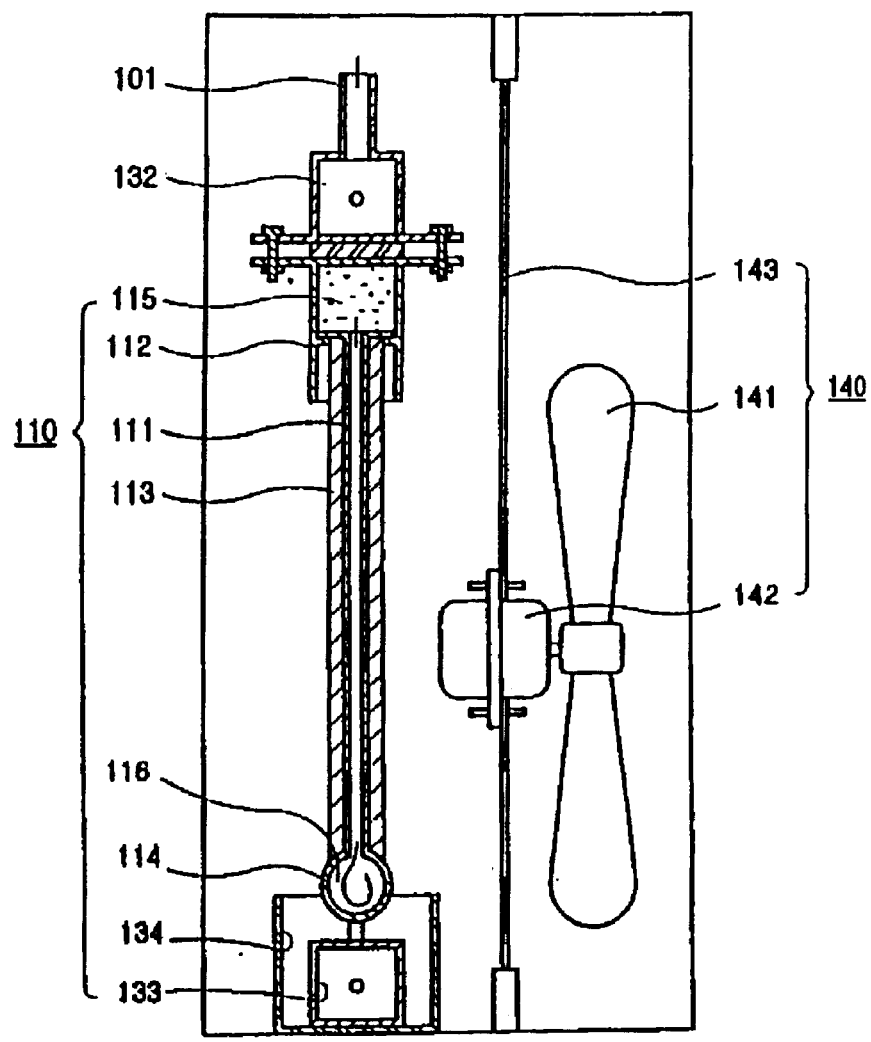
FIG. 4 is a cross-sectional view of the air conditioner of FIG. 1, shown in cross-section across the longitudinal axis of the air conditioning device.
Figure 5:
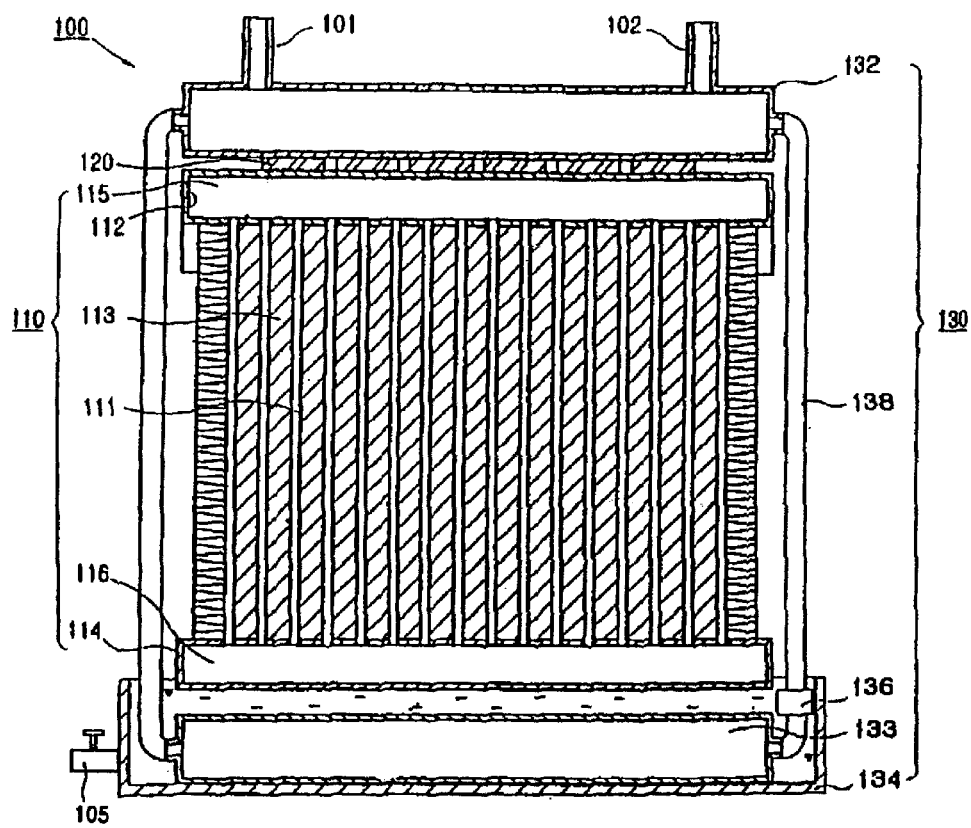
FIG. 5 is a cross-sectional view of the air conditioning device of FIG. 1, shown in cross-section along a longitudinal plane of the air conditioning device.

With reference to cross-sectional views of the air conditioner shown in FIGS. 4 and 5, a schematic representation of the air conditioner is provided. As mentioned above, the heat pipes 111 define a plurality of vertically aligned capillary channels extending between the upper cylinder 112 and the lower cylinder 114. The thermally conductive fluid contained within the manifold communicates between the lower space occupied by the liquid phase (116) and the upper space generally occupied by the vapor phase (115), along the capillary channels.

In the air conditioning assembly, the thermoelectric modules are arranged so that their respective cooling faces are in thermal communication with the upper cylinder 112 and the upper heating faces of the thermoelectric modules are in thermal communication with upper water chamber 132. The linear array of thermoelectric modules 120 is in direct contact with the upper surface of upper cylinder 112, and consequently in thermal communication with the thermally conductive fluid contained within the interior volume of the manifold. The thermally conductive fluid contained within the interior volume of the manifold continuously circulates as a liquid phase at the lower end of the manifold, the liquid evaporates, and slugs of such vapor ascend through the vertically aligned capillaries toward the upper end of the manifold, toward the vapor space and condense near the upper end of the manifold. Condensing fluid will normally drain downwardly through the capillary channels while slugs of vapor of the thermally conductive fluid will tend to rise within the capillaries. Circulation of the thermally conductive fluid within the manifold will continuously and repeatedly cycle throughout the operation of the air conditioner, in the absence of an added pump, compressor or other similar device to drive the movement of the thermally conductive fluid. Although in some embodiments, a supplemental pump or other device may be added to enhance the internal flow of the thermally conductive fluid, such a device will not be necessary to impart a fluid flow of thermally conductive fluid within the internal capillary structure of the manifold.

The air conditioner may be provided with suitable channeling, directional and control features to direct the cooled air exiting from the air conditioner into a desirable target area. In addition, in certain embodiments, the cooling water passing through the upper cooling water chamber may be recovered or used as a warmed fluid directed elsewhere for other uses. Alternatively, the warmed fluid may be passed through another heat exchanger to cool that fluid and then recycle it for further use as a coolant within the upper cooling assembly 130.

Figure 6:
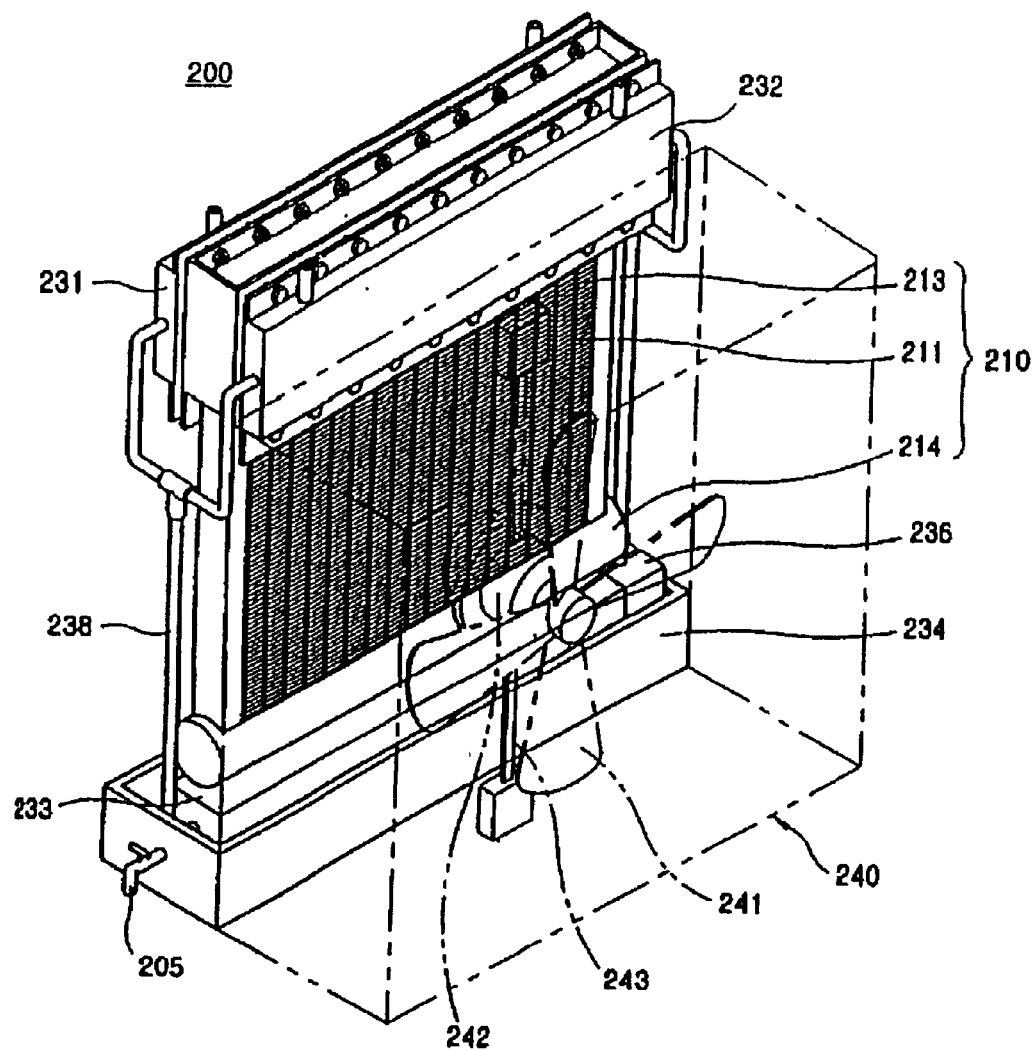
FIG. 6 is a perspective view of another embodiment of the present invention featuring an alternate air conditioning device.
Figure 7:
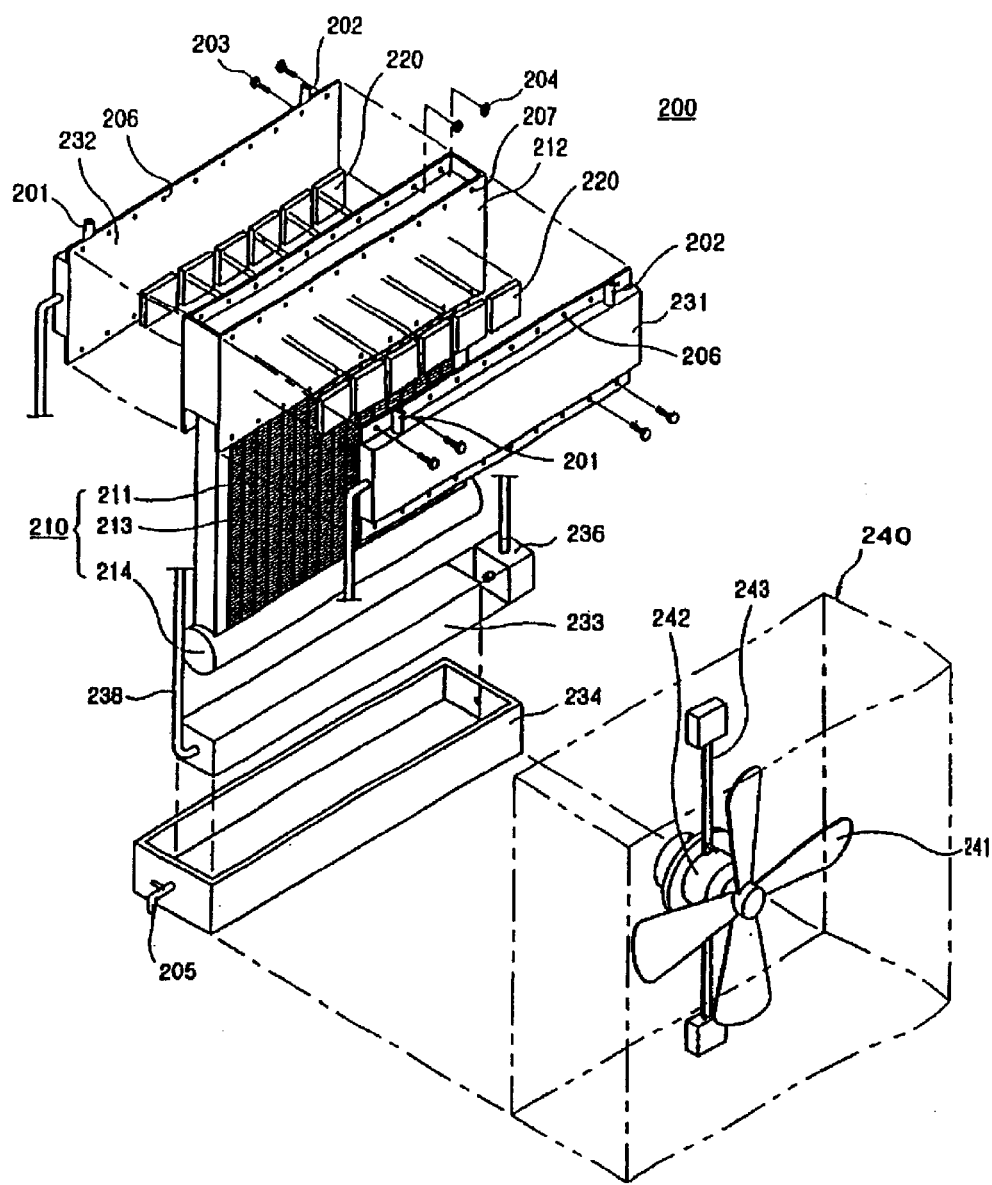
FIG. 7 is an exploded view, in partial section, of the air conditioning device shown in FIG. 6.
Figure 8:
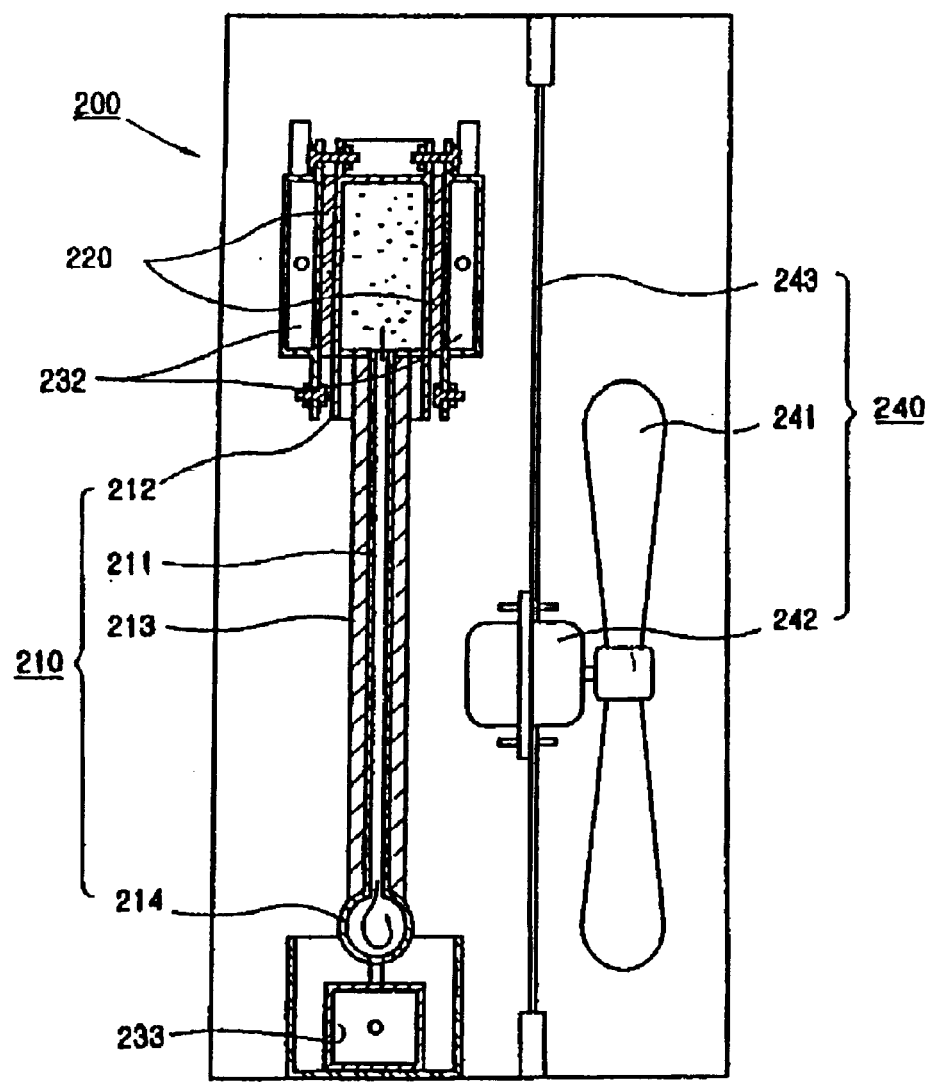
FIG. 8 is cross-sectional view of the air conditioning device shown in FIG. 6, shown in cross-section across the longitudinal axis of the air conditioning device.

In FIGS. 6, 7 and 8, an alternative embodiment of the air conditioner of the present invention is illustrated. In this embodiment, an air conditioner 200 comprises a cooling manifold 210, a plurality of thermoelectric modules 220 positioned in linear arrays. The thermoelectric modules 220 are positioned in thermal communication on two opposing surfaces of upper cylinder 212 of the manifold. The upper cooling assembly 230 comprises upper cooling water chambers 231, 232, lower cooling water chamber 233, water condensation tank 234, circulation pump 236, and water circulation piping 238. In this embodiment, two rows of thermoelectric modules 220 are affixed on opposing walls of the upper cylinder 212 of the manifold. The two opposing rows of thermoelectric modules are positioned so that their respective cooling faces are in thermal communication with the outer surface of the upper cylinder 212. The thermoelectric modules are positioned between two opposing pairs of connecting plates 206, 207. The heating surfaces of the thermoelectric modules face outwardly away from the upper cylinder of the manifold. That is, the outwardly facing heating surfaces of the thermoelectric modules 230 are in thermal communication with two upper cooling water chambers 231, 232. In this embodiment, the effective cooling capacity applied to the upper cylinder of the manifold has been multiplied by utilizing a great surface area of the upper cylinder, when compared to an embodiment of the type illustrated in FIGS. 1 to 5. The upper cooling water chambers 231, 232 are in fluid communication with other components of the cooling assembly through piping 238. The circulation pump 236 is positioned in a convenient location to circulate water through the system. In this embodiment, water condensation tank 234 is positioned at a location below the upper cooling water chambers 231, 232. Water collected in the water condensation tank is circulated by pump 236 into the cooling water chamber 231, 232. The upper cooling water chambers 231, 232 are each provided with water inlet ports 201 and water outlet ports 202 to permit water flow through the upper cooling water chambers.

A spout 205 is provided on water condensation tank 234 to permit out flow of any excess water that may accumulate in the condensation tank 234.

Protective gaskets may be placed between the opposing pairs of connecting plates 206, 207 to protect the intermediately positioned thermoelectric modules 230 against accidental damage. In addition, the protective gaskets may be provided within insulative qualities to inhibit undesirable heat transfer in the upper section of the air conditioning device.

The cooling manifold 210 is in thermal communication with the cooling faces of the thermoelectric modules 230. The manifold defines an interior volume for containment of a thermally conductive fluid selected for the particular heat transfer function, which in this case, is for cooling purposes. The selected thermally conductive fluid is charged into the interior volume of the manifold so that a portion of that volume is occupied by the vapor phase of the fluid (generally presented by space 215). The second portion of the interior volume of the manifold 210 is occupied by the liquid phase of the thermally conductive fluid (generally at space 216). The liquid phase of the fluid will undergo an evaporation step during operation of the air conditioner so that plugs of vapor will migrate upwardly through the capillary channels of various heat pipes 213 provided in the manifold. The vapor will tend to travel into the vapor space 215, generally located within the upper cylinder. The vapor will tend to condense and flow downwardly within the capillary channels in the heat pipes.

The various heat pipes 211 provide fluid communication between upper cylinder 212 and lower cylinder 214 of the manifold. The plurality of heat pipes are positioned in parallel along and between the upper cylinder and lower cylinder. Cooling fins 213 are positioned in the gaps formed between opposing pairs of heat pipes in the manifold. The cooling fins 213 are made of a thermally conductive material to provide an increased heat transfer surface between the heat pipes 211 and air flowing through the gaps between opposing heat pipes.

Coaxial holes are provided in opposing pairs of connecting plates 206, 207 so that bolts 203 and nuts 204 may be used to securely fasten together the connecting plates, and the intermediately placed thermoelectric modules (and gaskets, if provided).

An air blower assembly 240 is also provided in which a driving motor 242 powers a fan 241 to force air through the cooling manifold, for delivery of cooled air to a target area. The motor 242 and fan 241 are mounted on a support 243. A temperature sensor and control unit may be provided to regulate operation of the air conditioner device. The unit may be controlled to turn off and on according to demand conditions that may arise over time. Similarly, control features may be provided to direct the volume of cooled air delivered by the air conditioner. Other control features may be provided to direct cooled air to one or more different locations.

Figure 9:
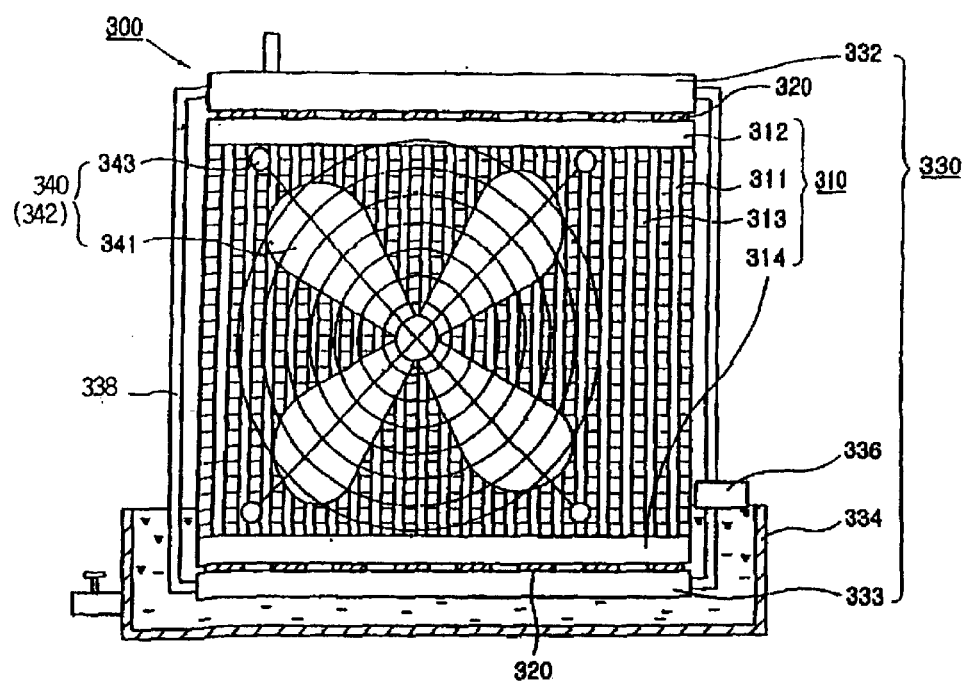
FIG. 9 is a front view, in partial cross-section, of another embodiment of an air conditioning device of the present invention.

FIG. 9 shows a partial cross-section of another embodiment of the present invention. A modified air conditioner 300 is depicted. In this embodiment, the air conditioner 300 comprises a heater suitable for use during cold temperature conditions. In this embodiment, two rows of thermoelectric modules 320, 320' are positioned adjacent the upper end, and the lower end, respectively, of the manifold 310. In this case, the manifold 310 is charged with the thermally conductive fluid selected for a heating function. The interior volume defined by the manifold 310 is charged with a vapor phase portion of the thermally conductive fluid and a liquid phase component of the thermally conductive fluid. The upper cylinder 312 and lower cylinder 314 of the manifold 310 are in fluid communication through the capillary channels extending through the heat pipes 311.

The upper row 320 of the thermoelectric modules is positioned so that their respective heating faces are in thermal communication with a surface of the upper cylinder 312. The lower row of thermoelectric modules 320' are positioned so that their heating faces are in thermal communication with a surface of the lower cylinder 314. The two rows of thermoelectric modules 320, 320' thermally communicate with the manifold 310 in order to impart thermal energy to the thermally conductive fluid contained within the manifold.

In this embodiment, water or an alternate thermally conductive fluid having enhanced anti-freeze characteristics, circulates within the upper cooling chamber 332, inter-connecting piping 338, and lower cooling chamber 333. Circulating pump 336 circulates water, or another selected thermally conductive fluid, within those inter-connected components of the cooling system 330. The cooling systems 330 also include a lower reservoir 334 filled with water or other suitable thermally conductive fluid which may have enhanced anti-freeze characteristics to inhibit freezing in low temperature conditions. The cooling system 330 circulates a cooling fluid, which in some cases may be water, to provide a heat transfer medium in thermal communication with the cooling faces of the upper and lower rows 320, 320' of the thermoelectric modules.

An air blower system 340 includes a fan 341 powered by a motor 342 in an assembly where the fan and the motor are supported on the heater by mounting brackets 343.

Figure 10:
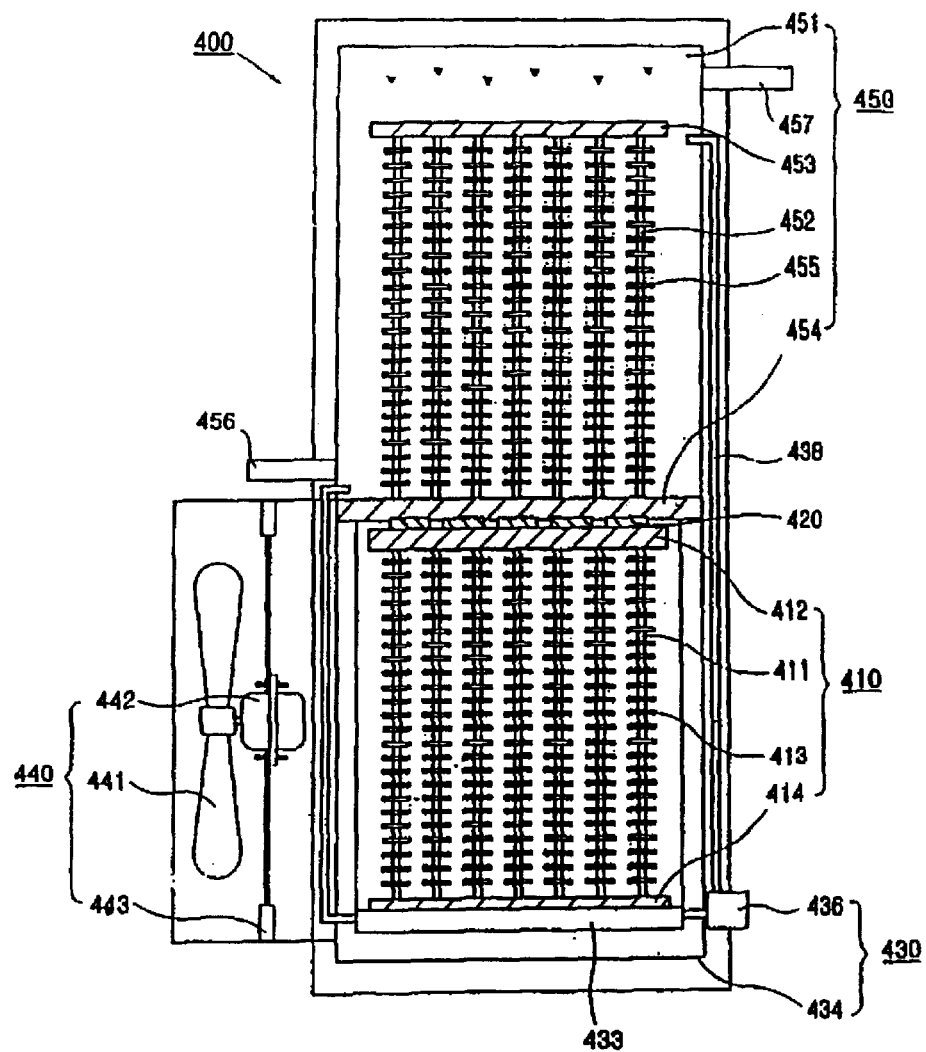
FIG. 10 is a schematic representation, of a partial sectional view of an alternative embodiment of an air conditioning device of the present invention

Yet another embodiment of this invention is illustrated in association with FIG. 10. In this embodiment, a schematic representation is shown, in cross-section, of an alternative embodiment comprising a cooling manifold component and a heating manifold component capable of supplying cool air and warm water respectively. Such an assembly may be particularly useful in association with applications in which temperature control within enclosed spaces is desirable over a wide range of ambient temperature conditions. For example, both cooling and heating functions may be desirable in building structures in which temperatures may fluctuate between cold and hot extremes. Similarly, embodiments of this type may be modified for use within automobiles and other structures with enclosed spaces.

An air conditioning assembly 400 includes a pair of stacked manifolds 410, 410'. Lower manifold 410 comprises an upper cylinder 412 in fluid communication with 414 through inter-connecting heat pipes 413. Heat pipes 413 define a plurality of capillary channels extending between upper cylinder 412 and lower cylinder 414. The lower manifold 410 defines a cooling manifold in which an interior volume is occupied by a thermally conductive fluid, preferably, selected for use in a refrigerating device. Upper cylinder 412 of cooling manifold 410 is in thermal communication with the cooling faces of aligned thermoelectric modules 420. The array of thermally electric modules is also positioned in thermal communication with the lower cylinder 454 of upper manifold 410'. Lower cylinder 454 of upper manifold 410' is in thermal communication with upper cylinder 453. Upper heat pipes 452 also define a plurality of capillary channels for fluid communication between upper cylinder 453 and lower cylinder 454. Conductive fins 455 radiate outwardly from heat pipes 452 to provide added surface area for enhanced heat exchange with surrounding warm water contained within water jacket 451. (In some instances, an alternative thermally conductive fluid may be substituted for water within jacket 451 which surrounds upper manifold 410'. It will be apparent that alternative systems may employ thermally conductive fluids other than water. However, in many instances, water may be a convenient, low cost and otherwise satisfactory thermally conductive fluid suitable for circulation within the upper jacket 451.) In this embodiment, water inlet 456 provides a port for inflow of water into jacket 451. Water circulates within the jacket 451, in thermal communication with the exposed surfaces of the upper manifold 450'. The water is heated and thereafter exits through water outlet 457. Warm water assembly 450 may be used to supply warm water (or other warmed thermally conductive fluid) to designated target areas.

In this assembly, lower manifold assembly 450 is positioned so that upper cylinder 412 is in thermal communication with the cooling faces of intermediately positioned thermoelectric modules 420. Under appropriate operating conditions, air will be channeled or will flow across the exposed surfaces of lower manifold 410 to cool such air and thereafter deliver the cooled air to a designated target area. In this embodiment, a fan 441 is powered by motor 442, supported on a mounting element 443. The blower assembly 440 is positioned to draw air across the exposed surfaces of the cooling manifold 410. In this embodiment, radiant fins 413 radiate outwardly from cooling fins 411 to provide enhanced heat transfer between the flowing air and the manifold during operation.

In this embodiment, an enclosed warm water circulation system is used. Water (or another suitable thermally conductive fluid) is circulated between water jacket 451 and lower cooling cylinder 433 by circulating pump 436. Water entering into lower cylinder 433 of cooling manifold 410 will be pre-heated upon contact with lower cylinder 414 of cooling manifold 410. Water flowing through lower water heating chamber 433 is pumped by circulating pump 436 through piping 438 and into warm water chamber 451. Lower water heating chamber 433 may define a water jacket enveloping lower cylinder 414 to enhance heat transfer between fluid within the jacket of chamber 433 and the thermally conductive fluid circulating with manifold 410.

A water condensing chamber 434 may also be provided to collect water condensed from exposed surfaces of the cooling manifold 410 during operation of the air conditioner.

Figure 11:
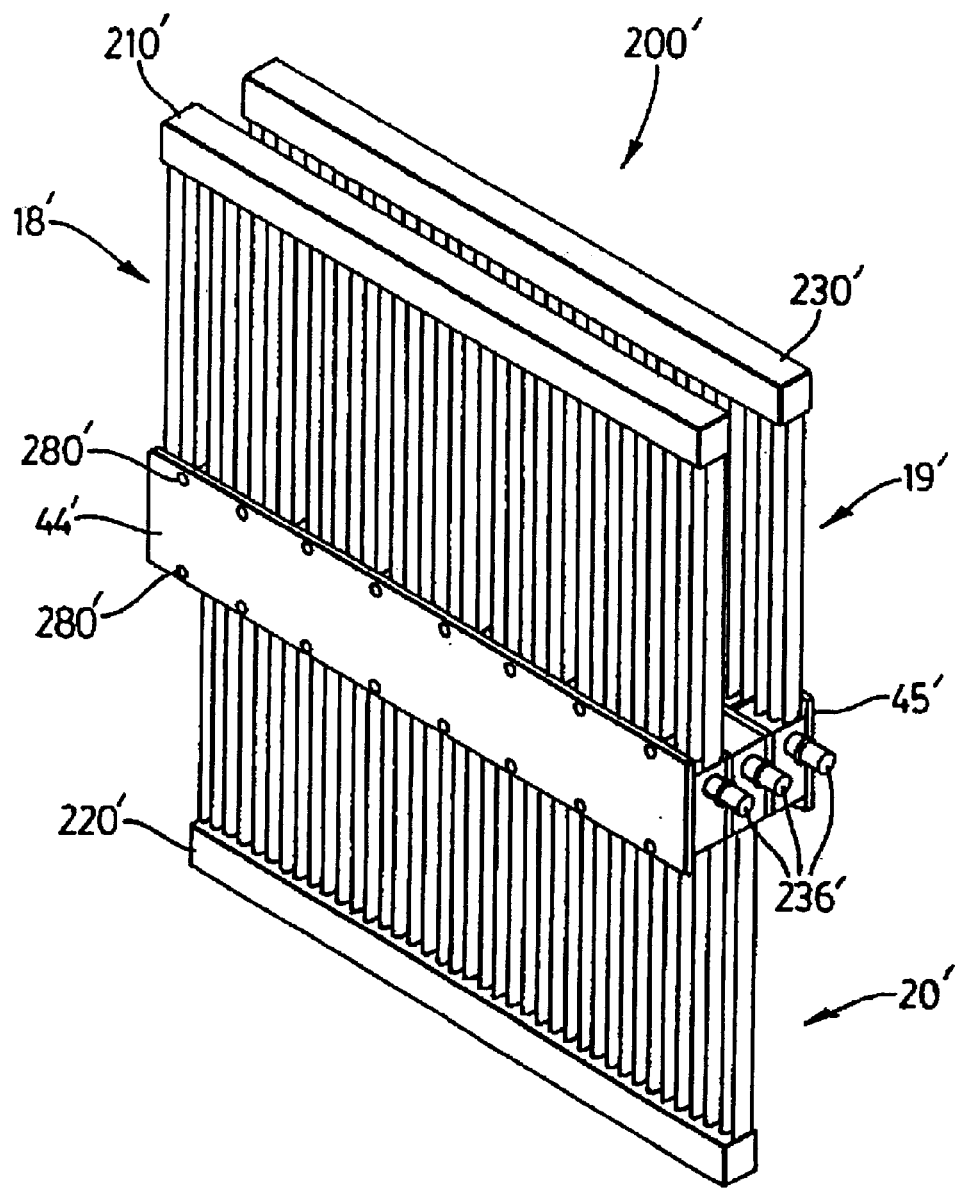
FIG. 11 illustrates a heating and cooling core used in a preferred embodiment of the invention in which a plurality of heat exchangers have been arranged in thermal contact with a linear bank of thermoelectric modules.
Figure 12:
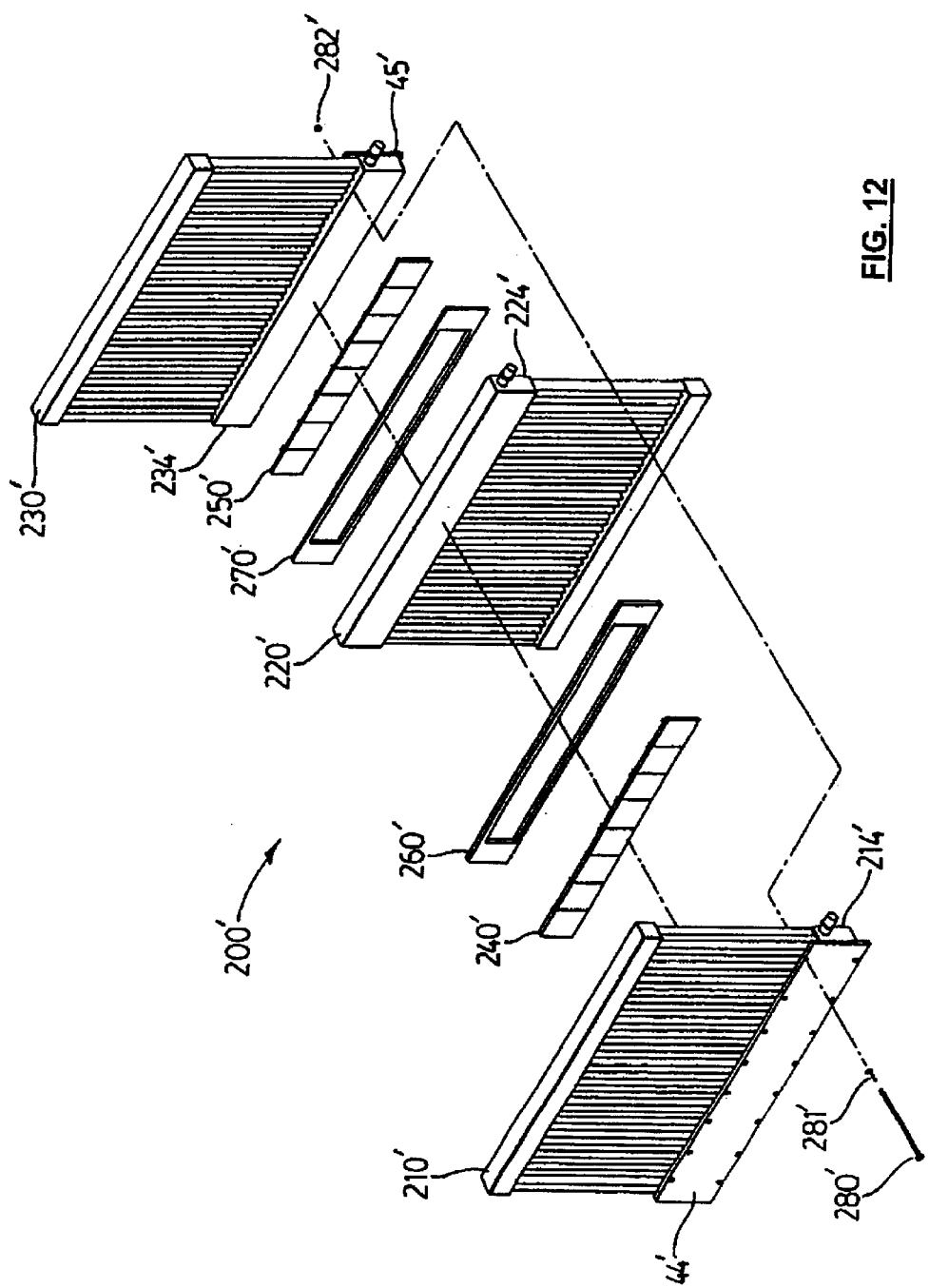
FIG. 12 is an exploded perspective view of the preferred embodiment shown in FIG. 11.
Figure 13:
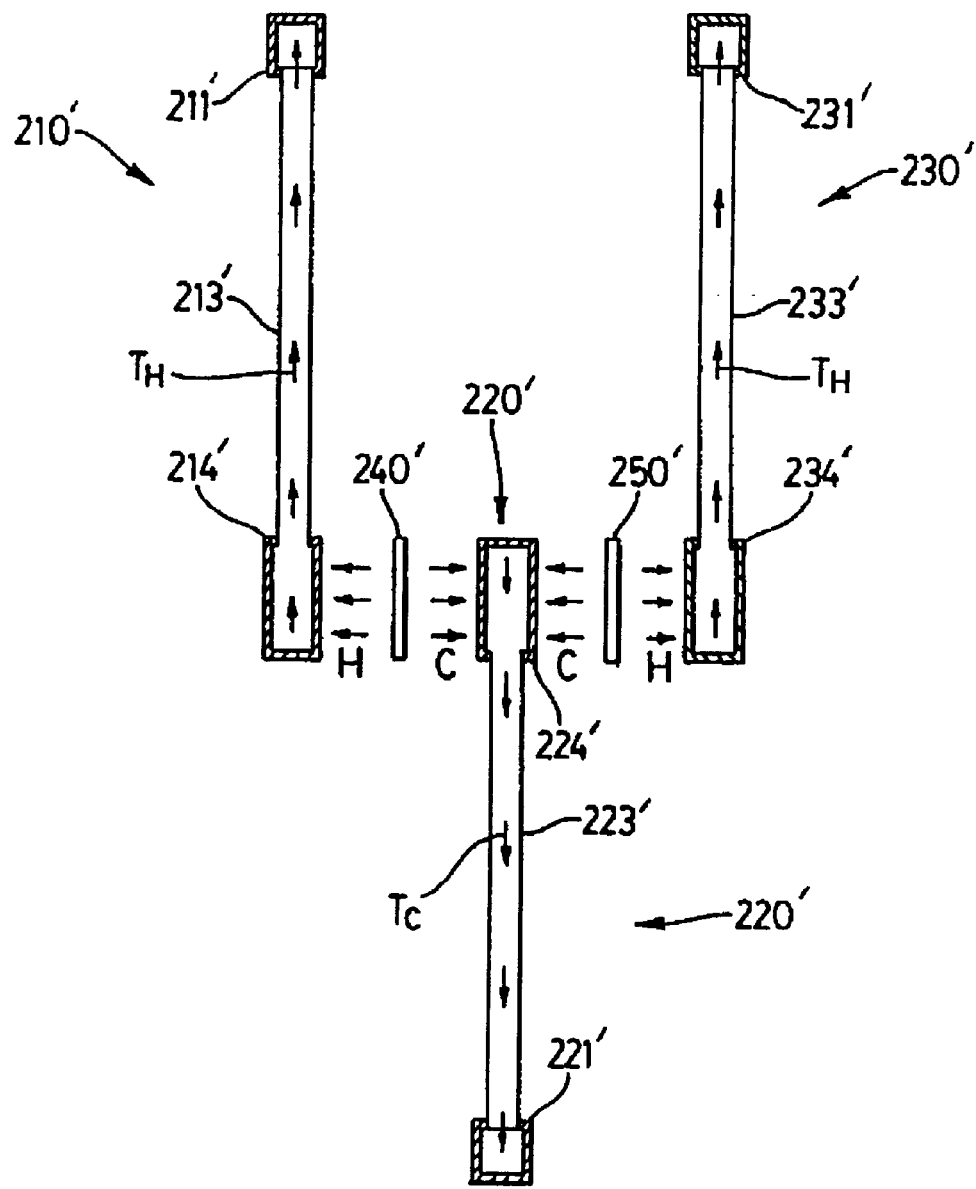
FIG. 13 is a cross-sectional view, in schematic form, of the preferred embodiment shown in FIG. 12.

FIGS. 11, 12 and 13 illustrate a combination heater and air conditioner core of a prefered embodiment of the invention featuring three identical manifolds 210', 220', and 230' combined in a combined heat exchanger arrangement 200'. Upper heating manifolds 210' and 230' (corresponding to heating zones 18, 19) are secured on opposite sides of interior, lower cooling manifold 220' (corresponding to lower, cooling zone 20). All three manifolds are shown with identical sealed or capped access ports 236. The access ports 236 are used to fill the manifolds with suitable heating fluids and refrigerant. Long threaded bolts 280', (provided with assembly washers 281') are provided with corresponding nuts 282', so that when fastened together, the bolt and nut assemblies secure the outer clamping plates 44' and 45' to hold the manifolds in place. Two linear banks of thermoelectric modules 240' and 250' are sandwiched between the corresponding tail pipes 214', 224', and 234' of manifolds 210', 220', and 230'. Insulating gaskets 260' and 270' are made of suitable insulating material. Each gasket provides an interior space corresponding in dimensions to the corresponding array of thermoelectric modules. The linear array of modules 240' and 250' fits within insulating gaskets 260' and 270' to minimize undesirable heat transfer along the contact edges of the modules. The gaskets may also be suitably reinforced to prevent accidental fracture or damage to the thermoelectric modules if the bolt and nut assemblies are over-tightened during assembly of the multiple manifold arrangement.

As illustrated by FIG. 13, the thermoelectric modules are arranged so that all modules in linear array 240' are positioned so that their cooling faces cool the adjacent outer wall of the tail pipe 224' in manifold 220'. Similarly the thermoelectric modules in linear array 250' are also positioned so that their cooling faces cool the opposite outer wall of the tail pipe 224' in manifold 220'. The cooling effect on lower manifold 220' (indicated by arrows C) induces a generally downward movement $T_C$ of the thermally conductive fluid within the capillaries (not shown) provided within the lower radiant fins 223'. The cooled fluid tends to flow toward lower head pipe 221'. At the same time, the heating faces of thermoelectric module arrays 240' and 250' heat the adjacent outer walls of tail pipes 214' and 234' of upper manifolds 210', 230'. The heating of the tail pipes 214' and 234' induces a generally upward movement $T_H$ of the thermally conductive fluid within the capillaries (not shown) within the upper radiant fins 213', 233' of upper manifolds 210', 230' The heated fluid tends to flow toward upper head pipes 211', 231' of upper manifolds 210', 230'.

Figure 14A:
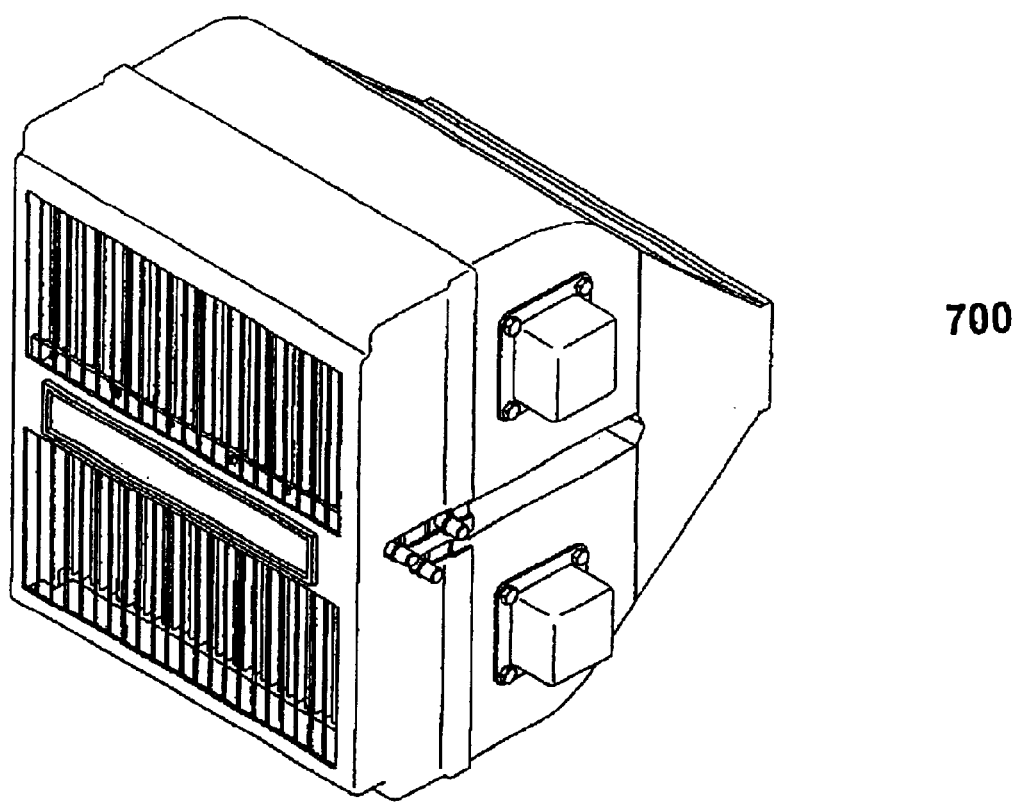
FIG. 14A shows an assembled body of a preferred embodiment of the invention, comprising the heat exchangers of FIGS. 11 to 13, for use in an automotive vehicle.
Figure 14B:
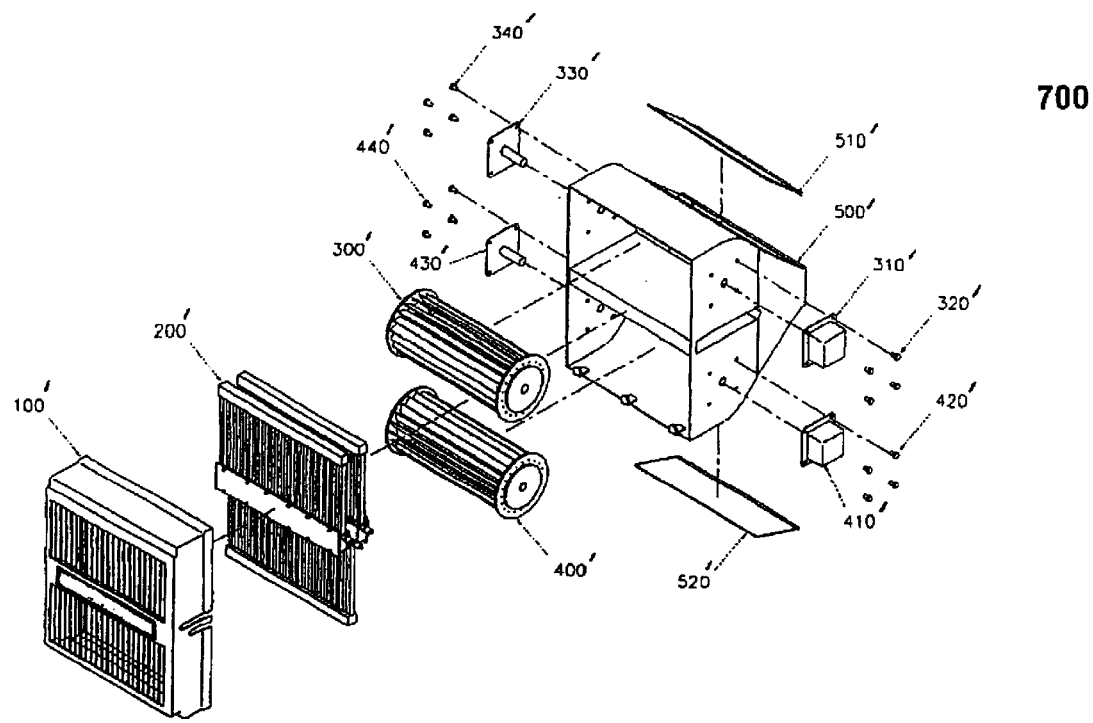
FIG. 14B is an exploded, view of the embodiment of FIG. 14A, showing the components thereof in perspective.
Figure 14C:
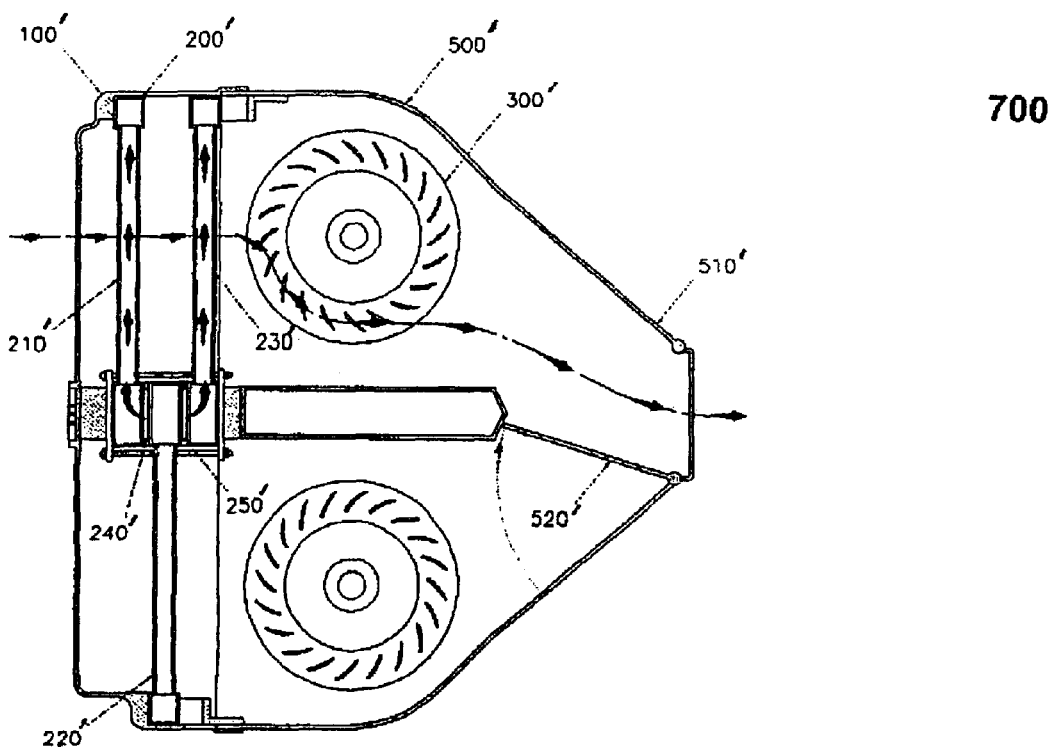
FIG. 14C is a cross-sectional view, in schematic, of a first operating condition of the embodiment shown in FIG. 14A.
Figure 14D:
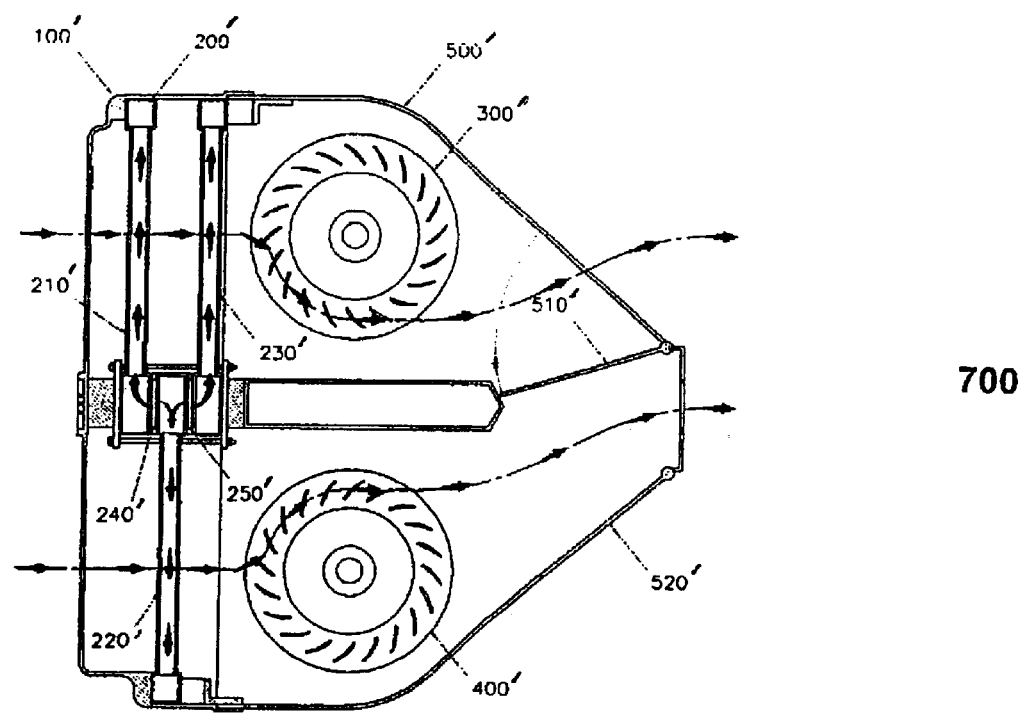
FIG. 14D is a cross-sectional view, in schematic, of a second operating condition of the embodiment shown in FIG. 14A.

FIGS. 14A, 14B, 14C and 14D illustrate yet another preferred embodiment of a combination of an air heater and air conditioner adapted for use in an automotive vehicle. Assembled heater and air conditioner assembly 700 is shown in FIG. 14A. An exploded, perspective view of the major components of the heater and air conditioner assembly 700 are shown in FIG. 14B. A front cover 100 provides a grill or screen defining an air intake for the manifold assembly 200. The manifold assembly 200 corresponds to the assembly illustrated in FIGS. 11 to 13, above. The cooling/heater assembly 700 includes a housing 500 which defines an upper heating air intake which contains a heating fan 300. The housing also defines a lower cooling air intake to house a cooling fan 400. Heating fan 300 and cooling fan 400 are independently mounted and powered by separate motors 310 and 410, respectively. Heating fan 300 is rotatably mounted on mount 330. Heating fan 300 is powered by corresponding heating motor 310 upon demand. Mounting screws 340 secure mount 330 to housing 500. Motor 310 is secured to housing 500 by means of mounting screws 320. Cooling fan 400 is rotatably mounted on mount 430. Mount 430 is secured to housing 500 mounting screws 440. Cooling fan 400 is driven by motor 410, upon demand. Motor 410 is mounted to housing 500 by mounting screws 420. Two regulator flow valves 510, 520 are mounted within the housing to control air flow through the housing. By controlling the relative positions of regulator flow valves 510, 520, it is possible to direct cold air, or warmed air, into the passenger compartment of a motor vehicle. For example, with reference to FIG. 14C, lower regulator flow valve 520 is in a closed position. Similarly, upper regulator flow valve 510 is also in the closed position so that cold air entering into the warm air intake passes through the gaps between the heat pipes of upper manifolds 210 and 230 and that warmed air will be forced into the vehicle compartment by rotating heating fan 300. With reference to FIG. 14D, a cooling cycle is illustrated in which outside air is drawn in across cooling manifold 220 for cooling, and the cooled air is drawn into the passenger compartment by cooling fan 400. In this operating condition, lower regulator flow valve 520 is open so that cooled air may enter into the vehicle compartment. Upper regulator flow valve 510 is positioned so that warmed air driven by the heating fan 300 may be exhausted out of the housing 500. Under certain circumstances, it will be desirable to operate the heating fan 300 and cooling fan 400 simultaneously during operation of the air conditioner in hot summer months. For example, ambient air may be taken into the warm air intake portion of the housing 500 so that the ambient air may be used to cool the heat pipes of upper manifolds 210, 230. The warmed air will then be exhausted from the housing and may be directed away from the passenger compartment.

It will be appreciated that the present invention has been described with reference to preferred embodiments and other examples. However, other embodiments of the invention, variations and modifications of those embodiments will be apparent to those persons having ordinary skill in the art. It is intended that those other embodiments, variations and modifications thereof, will be included within the scope of the present invention as claimed within the appended claims.

We claim:

1. An air conditioning device comprising:
   a housing defining an air channel for directing air across a manifold;
   the manifold defining an inner chamber for a thermally conductive fluid, the inner chamber comprising a vapor phase chamber, a liquid phase chamber and a plurality of capillary channels defined by heat pipes extending between the vapor and liquid phase chambers; and
   a pre-selected number of thermoelectric modules arranged so that like faces of the modules are in thermal communication with the manifold.

2. The device claimed in claim 1 comprising a plurality of heat pipes in a linear array, each heat pipe defining elongated planar surfaces, the planar surfaces of the heat pipes being parallel to opposing planar surfaces defined by a pair of adjacent, like heat pipes.

3. The device claimed in claim 2, wherein a pair of adjacent heat pipes define a gap, and conductive fins are provided within the gap, in thermal communication with one or both of the pair of adjacent heat pipes.

4. The device claimed in claim 3, wherein the inner chamber is filled with an effective amount of thermally conductive fluid.

5. The device claimed in claim 4, wherein the amount of thermally conductive fluid comprises between about 40 percent and 70 percent liquid by volume and between about 30 percent and 60 percent vapor by volume.

6. The device claimed in claim 5 wherein the capillary channels are less than about 4 mm in diameter.

7. The device claimed in claim 6 comprising a blower to feed air through the air channel.

8. The device claimed in claim 7, comprising one or more regulator valves to direct air flowing within the air channel to one or more selectable destinations.

9. The device claimed in claim 1 comprising a second, vertically oriented manifold, adjacent the first manifold, the thermoelectric modules being positioned between and in thermal communication with both manifolds, to heat the first manifold and to cool the second manifold.

10. The device claimed in claim 9, wherein the first manifold is positioned above the second manifold, each manifold defining a vertical plane; and the thermoelectric modules define a linear array in thermal communication with a lower end of the first manifold, and the modules are in thermal communication with an upper end of the second manifold.

11. The device claimed in claim 1 wherein the manifold is cooled by a linear array of the thermoelectric modules, the thermoelectric modules defining heating faces in thermal communication with an upper water chamber, the chamber defining a water inlet and a water outlet and a channel for water flow through the water chamber.

12. The device claimed in claim 11, comprising a lower water chamber in fluid communication with the upper water chamber, and a pump for directing water from the lower chamber to the upper water chamber.

13. The device claimed in claim 12 comprising a trap for collecting water condensed when the manifold is used to cool air, and a pipe to direct the condensed water to the upper water chamber.

14. The device claimed in claim 12, comprising a second linear array of thermoelectric modules in cooling, thermal communication adjacent an upper end of the manifold, the first and second linear array being secured to a pair of opposing walls defined by the manifold.

15. The device claimed in claim 14, wherein heating faces defined by the first and second linear arrays of thermoelectric modules are in thermal communication with the first upper water chamber and a second upper water chamber, the second water chamber defining a second water inlet and a second water outlet and a second channel for directing water through the second water chamber.

16. The device claimed in claim 1, comprising a second manifold in thermal communication with a water chamber and in thermal communication with heating faces defined by the thermoelectric modules.

17. The device claimed in claim 10 comprising a first blower operatively connected to force air through first heat transfer channels defined by the first manifold, and a second blower operatively connected to force air through second heat transfer channels defined by the second manifold.

18. The device claimed in claim 17 comprising a first regulator valve operatively associated with the first heat transfer channels to selectively direct chilled air to a designated area when the first valve is in a first position, and a second regulator valve operatively associated with the second heat transfer channels to selectively direct heated air away from the designated area when the first valve is in the first position.

19. In the device claimed in claim 18, the first regulator valve preventing chilled air from entering the designated area when the valve is in a second position, and the second regulator valve selectively directs heated air to the designated area when the first valve is in the second position.

20. An air conditioning device comprising:
a housing defining one or more air channels for directing air across one or more manifolds;
the manifold defining an inner chamber for thermally conductive fluid, the manifold comprising:
a first pipe paralled to a second pipe;
a plurality of capillary chambers defined by heat pipes in fluid communication between the first and second pipes;
An array of thermoelectric modules in like thermal communication with the manifold; and
A blower to force air through the air channels.

* * * * *